United States Patent [19]

Motoo

[11] Patent Number: 4,562,331
[45] Date of Patent: Dec. 31, 1985

[54] METHOD OF JOINING MEMBERS DIFFICULT TO FUSION WELD

[75] Inventor: Akihiko Motoo, Hiroshima, Japan

[73] Assignee: The Japan Steel Works, Ltd., Tokyo, Japan

[21] Appl. No.: 512,056

[22] Filed: Jul. 8, 1983

[51] Int. Cl.[4] ............................................... B23K 15/00
[52] U.S. Cl. .............................. 219/121 ED; 228/175
[58] Field of Search .................. 219/121 EC, 121 ED, 219/121 LC, 121 LD, 121 PJ, 121 PK, 85 R, 137 R; 228/120, 135, 175

[56] References Cited

U.S. PATENT DOCUMENTS 3,458,683 7/1969 Canonico et al. ............ 219/121 ED

FOREIGN PATENT DOCUMENTS 909725 10/1962 United Kingdom ......... 219/121 ED

Primary Examiner—C. L. Albritton
Attorney, Agent, or Firm—Sughrue, Mion, Zinn, Macpeak, and Seas

[57] ABSTRACT

A method of joining a member (A) which is difficult to fushion-weld made of, e.g., a hard alloy or ceramic, to another member (B) is described. The method includes the steps of: (1) fitting an insert ring made of a material fusion-weldable to the member (B) onto the member (A) by the application of pressure; (2) placing the member (A) with the insert ring fitted thereon in a predetermined position of the member (B) with a solder material interposed therebetween; (3) joining the insert ring to the member (B) by electron beam welding; and (4) melting the solder material by heating the member (B), thereby soldering the member (A) to the member (B). This method is applicable to, for example, the attachment of a tip made of a hard alloy or ceramic to a die of a pelletizer.

5 Claims, 10 Drawing Figures

METHOD OF JOINING MEMBERS DIFFICULT TO FUSION WELD

FIELD OF THE INVENTION

The present invention relates to a method of joining materials difficult to fusion-weld, as made of, e.g., a hard alloy or ceramic.

BACKGROUND OF THE INVENTION

In a die 1 of a pelletizer as shown in FIG. 1, a member 3 made of a hard alloy or ceramic is attached to the outlet side of a die nozzle 2 through which a resin is to be extruded. This member 3 is attached for the purpose of preventing abrasion of the die 1 due to contact with a cutter blade.

Heretofore, the member 3 has been soldered to the die 1, as illustrated in FIG. 2, in which a solder material is schematically shown and indicated by reference numeral 4. In accordance with such a soldering method, however, the die 1 and the member 3 were not always steadily joined together. In some cases, because of insufficient bond strength, the member 3 can peel apart and drop off.

SUMMARY OF THE INVENTION

The present invention is intended to overcome the above-described problems, and it is an object of the invention to provide a method for effectively joining members which are difficult to fusion-weld.

The present invention relates to a method of joining a member (A) which is difficult to fusion-weld made of, e.g., a hard alloy or ceramic, to another member (B), which comprises the following steps:

(1) fitting an insert ring made of a material fusion-weldable to the member (B) onto the member (A) by the application of pressure;

(2) placing the member (A) with the insert ring fitted thereon at a predetermined position on the member (B) with a solder material interposed therebetween;

(3) joining the insert ring to the member (B) by electron beam welding; and (4) melting the solder material by heating the member (B), thereby soldering the member (A) to the member (B).

DETAILED DESCRIPTION OF THE PREFERRED EMBODIMENTS

The present invention will hereinafter be explained by reference to the accompanying drawings.

An embodiment of the joining method of the invention is schematically illustrated in FIGS. 3 to 6.

Figure 1:
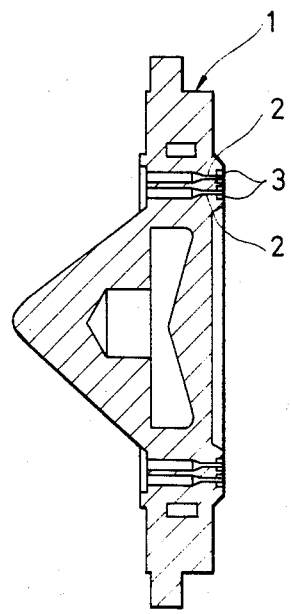
FIG. 1 is a cross-sectional view of a pelletizer die provided with a tip of a hard alloy according to a conventional joining method.
Figure 2:
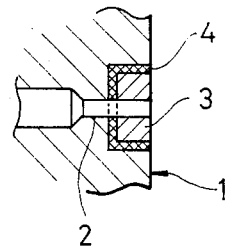
FIG. 2 is an enlarged partial cross-sectional view of the hard alloy tip of FIG. 1.
Figure 3:
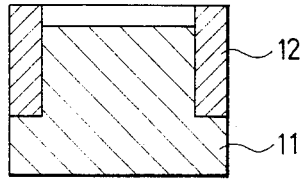
FIGS. 3 to 6 are cross-sectional views schematically illustrating, in order, the steps of the joining method of the invention.
Figure 4:
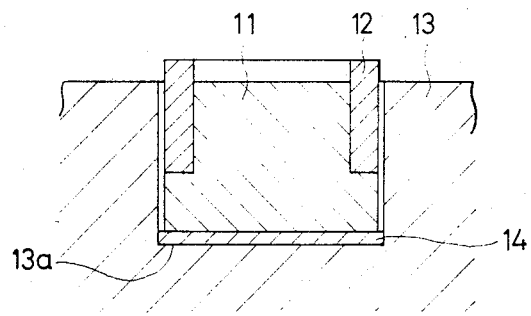
Figure 5:
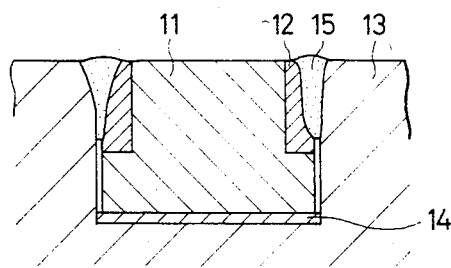
Figure 6:
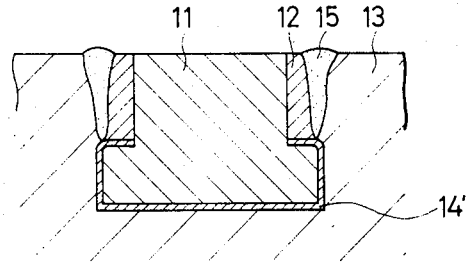

At first, as shown in FIG. 3, a member 11 which is difficult to fusion-weld (e.g., a tip for the die of a pelletizer) made of, e.g., a hard alloy or ceramic, and an insert ring 12 made of a fusion-weldable material are joined together by the application of pressure. Secondly, as shown in FIG. 4, the member 11 with the insert ring 12 provided thereon is fitted in a cavity 13a of another member 13 (e.g., the die for a pelletizer) to which the member 11 is to be joined. In this case, solder material 14 is placed in the clearance between the member 11 and the bottom of the cavity 13a. Thirdly, as shown in FIG. 5, the member 13 and the insert ring 12 are joined together by electron beam welding. A bead portion formed by electron beam welding is indicated by reference numeral 15. In the electron beam welding step, a beam of electrons is focused so as not to melt the member 11. Finally, the solder material 14 is melted by heating the member 13 in a vacuum furnace or inert gas atmosphere furnace whereby, as shown in FIG. 6, the member 11 and the member 13 are joined together by means of the solder material 14'. In this soldering process, the member 11 does not rise at all because it is fixed by the insert ring 12 which has been joined to the member 13 by electron beam welding. Accordingly, the quality of the soldered portion is stabilized.

Another embodiment of the joining method of the invention is schematically illustrated in FIGS. 7 to 10.

Figure 7:
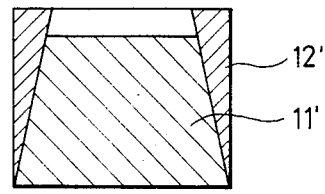
FIGS. 7 to 10 are cross-sectional views schematically illustrating, in order, the steps of another joining method of the invention.
Figure 8:
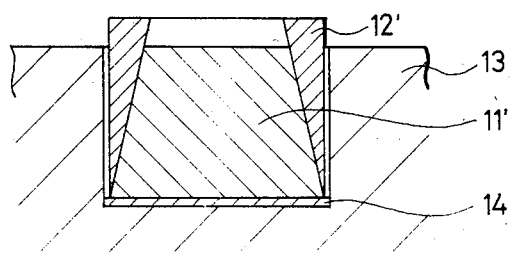
Figure 9:
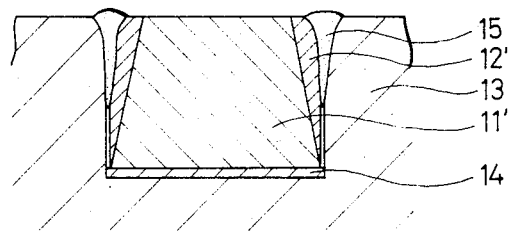
Figure 10:
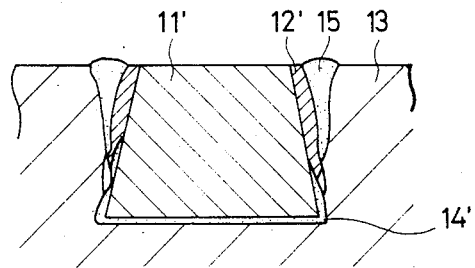

In this embodiment, as shown in FIG. 7, a member 11' which is difficult to fusion-weld is tapered and, conforming to the tapered member 11', an insert ring 12' is also reduced in thickness in the axial direction. Thereafter, as shown in FIGS. 8 to 10, the member 11' and another member 13 are joined together in the same manner as described in the foregoing embodiment. In the second embodiment, the same advantages as in the first embodiment can be obtained.

The method of the invention produces various advantages. Some of such advantages are given below:

(1) The soldered portion is prevented from rising because the member is already fixed by an insert ring which has been joined to another member by electron beam welding. Therefore, there can be obtained a soldered portion of stable quality.

(2) The member will not peel apart and drop off because it is secured not only by the soldered portion, but also by the insert ring joined by electron beam welding.

What is claimed is:

1. A method of joining a member (A), which is difficult to fusion-weld, to another member (B), comprising:
   (a) fitting an insert ring made of a material fusion-weldable to the member (B) onto the member (A) by the application of pressure;
   (b) placing the member (A) with the insert ring fitted thereon in a predetermined position of the member (B) with a solder material interposed therebetween;
   (c) joining the insert ring to the member (B) by high energy welding; and
   (d) melting the solder material by heating the member (B), thereby soldering the member (A) to the member (B).

2. A method as claimed in claim 1, wherein said member (A) is placed in a recess provided therefor in said member (B).

3. A method as claimed in claim 2, wherein said member (A) is reverse-tapered with respect to said recess.

4. A method as claimed in claim 3, wherein said insert ring is tapered conforming with said member (A).

5. A method as claimed in claim 1, wherein said insert ring and said member (B) are joined by electronbeam welding.

* * * * *